(12) United States Patent
Pribytkov

(10) Patent No.: US 6,569,323 B1
(45) Date of Patent: May 27, 2003

(54) APPARATUS FOR SEPARATION MEDIA BY CENTRIFUGAL FORCE

(76) Inventor: Lev Sergeevish Pribytkov, 355 Thomas Blvd. 3F, Orange, NJ (US) 07050

( * ) Notice: Subject to any disclaimer, the term of this patent is extended or adjusted under 35 U.S.C. 154(b) by 0 days.

(21) Appl. No.: 09/566,269

(22) Filed: May 8, 2000

Related U.S. Application Data

(63) Continuation-in-part of application No. 08/839,256, filed on Apr. 17, 1997, now abandoned, which is a continuation-in-part of application No. 08/301,262, filed on Sep. 6, 1994, now abandoned, which is a continuation-in-part of application No. 08/011,709, filed on Feb. 1, 1993, now abandoned.

(51) Int. Cl.$^7$ ................ B01D 35/18; B01D 17/038; B01D 21/26; B01D 45/12
(52) U.S. Cl. ................ 210/181; 55/459.1; 62/5; 209/715; 209/725; 210/512.1; 210/788
(58) Field of Search ................ 55/459.1; 62/5; 209/715, 725; 210/175, 181, 512.1, 788

(56) References Cited

U.S. PATENT DOCUMENTS

| | | | | |
|---|---|---|---|---|
| 3,287,924 A | * | 11/1966 | Bright | 62/5 |
| 3,768,658 A | * | 10/1973 | Palma | 210/512.1 |
| 4,333,017 A | * | 6/1982 | O'Connell | 62/5 |
| 4,343,707 A | * | 8/1982 | Lucas | 210/512.1 |
| 5,205,126 A | * | 4/1993 | Schnurr et al. | 62/5 |
| 5,248,421 A | * | 9/1993 | Robertson | 210/512.1 |
| 5,578,209 A | * | 11/1996 | Weiss | 210/512.1 |

* cited by examiner

Primary Examiner—David A. Reifsnyder

(57) ABSTRACT

An apparatus for the separation and purification of a mixture of gases, liquids or powders. The apparatus can be used for separating portions of the mixture such as desalting a seawater mixture or obtaining hot and cold without Freon. The apparatus includes a compressor or ventilator for moving the mixture through a spiral pipe or cavity, offshoots and heat exchangers or reservoirs. When the apparatus includes heat exchangers the heat exchangers are for heating and cooling the surrounding environment. The heat exchanger for heating the surrounding environment does so by receiving a relatively hotter portion of the mixture. The heat exchanger for cooling the surrounding environment does so by receiving a relatively cooler portion of the mixture. When the apparatus includes reservoirs the reservoirs are for holding separated portions of the mixture.

19 Claims, 6 Drawing Sheets

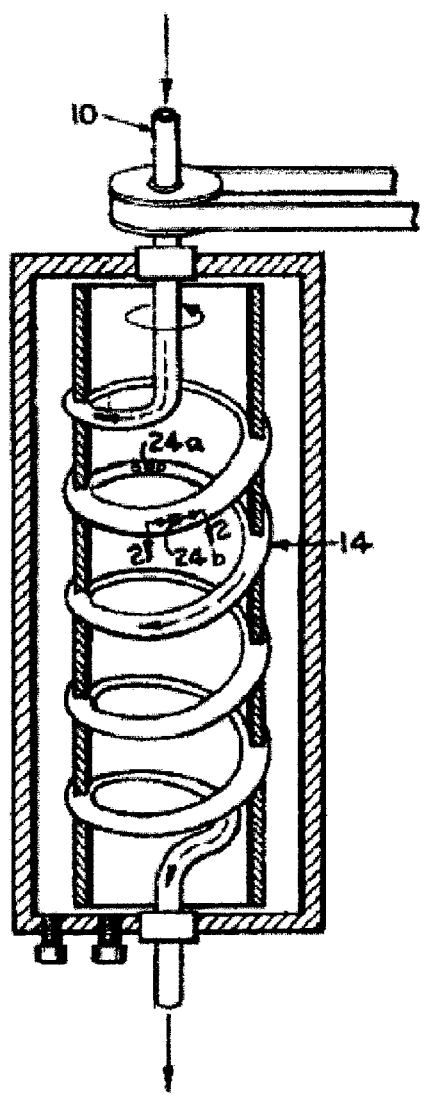
Fig. 1-A, Prior Art
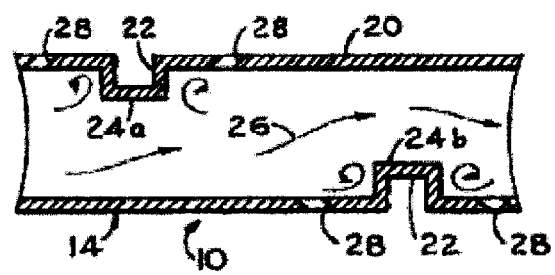
Fig. 1-B, Prior Art
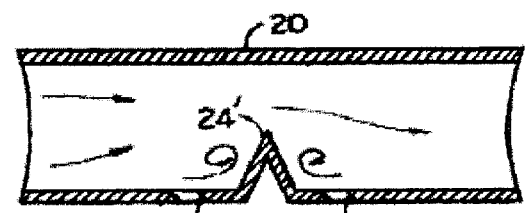
Fig. 1-C, Prior Art
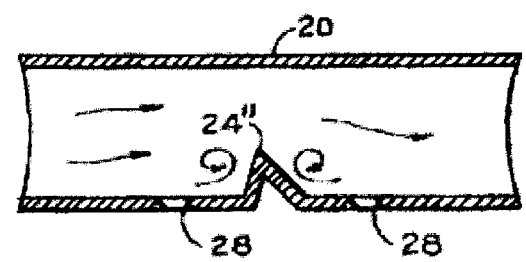
Fig. 1-E, Prior art
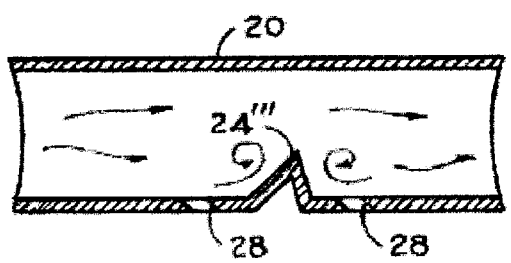
Fig. 1-D, Prior Art

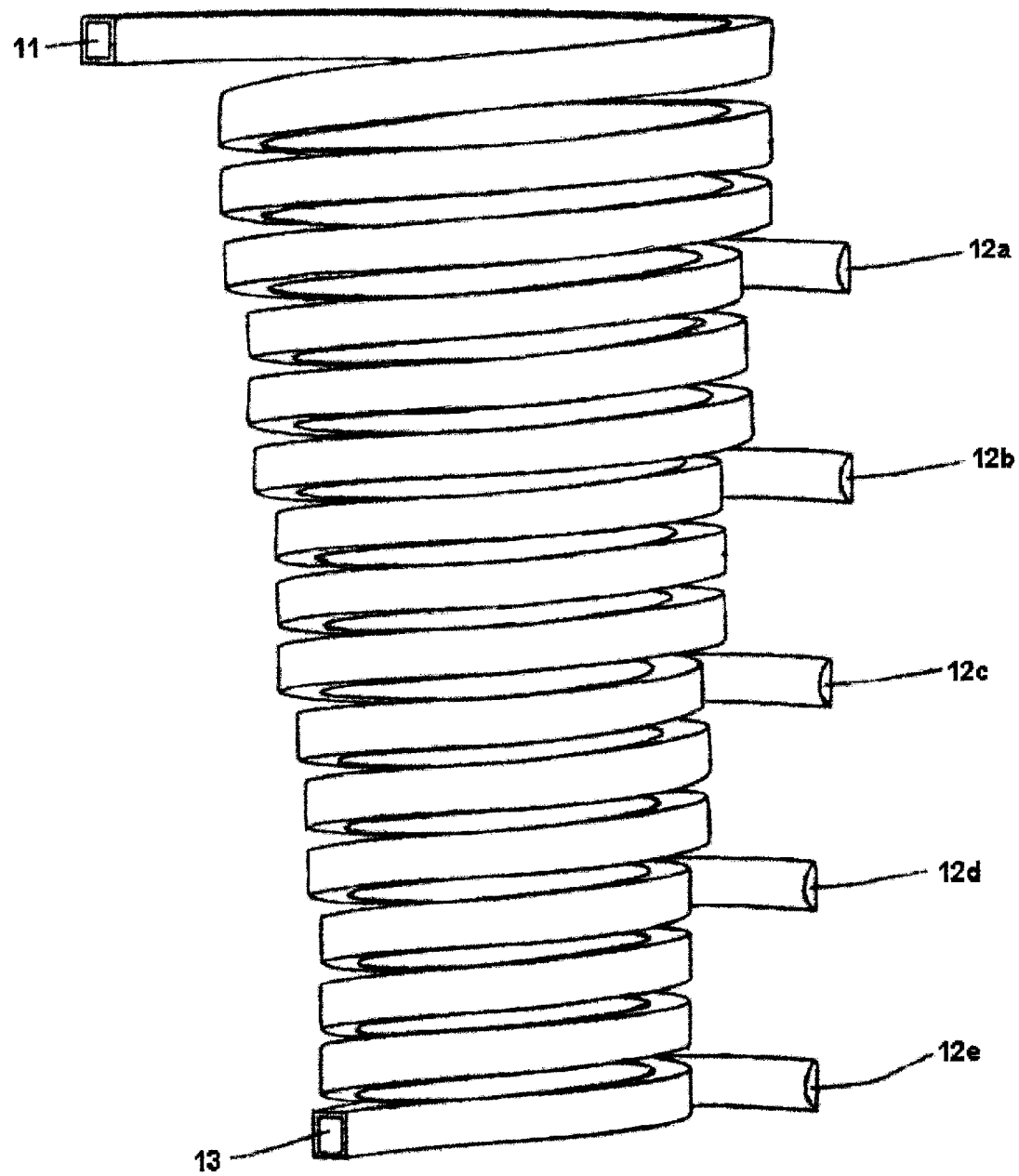
Fig. 12, Prior Art

APPARATUS FOR SEPARATION MEDIA BY CENTRIFUGAL FORCE

This application is a continuation-in-part of U.S. application Ser. No. 08/839,256, filed Apr. 17, 1997 now abandoned which is a continuation-in-part of U.S. application Ser. No. 08/301,262, filed Sep. 6, 1994 now abandoned which is a continuation-in-part of U.S. application Ser. No. 08/011,709, filed Feb. 1, 1993 now abandoned.

BACKGROUND OF THE INVENTION

The present invention relates to a device for the separation gases, liquids, and powders according their specific gravity by centrifugal force. This Device can be used on a vast scale for:

The separation and purification gases, liquids, powders:
For environment protection:
Extracting $SO_3$ from exhausts of power-plants for the prevention acid rains;
Extracting toxic gases from the exhausts of chemical plants;
For separating from air $O_2$ for medicine and metallurgy, $N_2$ for medicine and aerosols, and $CO_2$ for, the beverage industry;
For refining petroleum;
Desalting seawater;
For the design of environmentally sound cool down equipment operative in a wide range of temperatures.

It is known, that leading manufacturers of vortex coolers are Vortex and Exair ". . . The air enters tangentially and forms a rapidly spinning hollow vortex cylinder having a very high angular velocity . . . you need an air supply. And your air has to be extremely dry if the cooler is not going to freeze or jam. It's a very noisy situation." These defects have not been overcome for about 50 years.

As for Freon coolers, they cause environmental problems including creating ozone holes.

Another prototype is a U.S. Pat. No. 3,768,658 of James R. Palma "Separator" issued in 1973. It has three rotating hermetic connections, and a coiled conduit with numerous internally formed protrusions and openings that cause eddy currents.

Yet another prototype is a NASA U.S. Pat. No. 5,248,421 which is designed for separating mixtures in a narrow range of temperatures, pressures, speed and proportion of components.

THE INVENTION

The present invention:

The present invention relates to a device for the separation of gases, liquids, and powders according their specific gravity by centrifugal force. This Device can be used on a vast scale for:

The separation and purification gases, liquids, powders:
For environment protection:
Extracting $SO_3$ from the exhausts of power-plants for the prevention of acid rains;
Extracting toxic gases from the exhausts of chemical plants;
Separating from air $O_2$ for medicine and metallurgy, $N_2$ for medicine and aerosols, and $CO_2$ for beverage industry;
For refining petroleum;
Desalting seawater;
For the design of environmentally sound cool down equipment operative in a wide range of temperatures.

The improved apparatus for the separation and purification of gases, liquids, powders and desalting seawater comprises:
A device for moving the gas, liquid, powder or seawater;
A spiral pipe or cavity;
Offshoots;
Reservoirs.

The improved apparatus intended for heating and cooling by centrifugal force comprises:
A device for moving gas or liquid;
A spiral pipe or cavity;
Offshoots;
Heat exchangers;
Any homogeneous or component gas or liquid as a working substance.

The novel features, which are considered as characteristic for the invention, are set forth in particular in the appended claims. The invention itself, however, both as to its construction and so its method of operation, together with additional objects and advantages thereof, will be best understood from the following description of the specific embodiments when read in connection with the accompanying drawings.

BRIEF DESCRIPTION OF THE DRAWINGS.

FIGS. 1-A–1-E illustrates a prior art separator and its components;

FIG. 12 shows a prior art centrifugal separator of NASA U.S. Pat. No. 5,248,421 which includes a plurality of 2-way offshoots situated one after another along a spiral pipe.

DESCRIPTION OF THE PREFERRED EMBODIMENTS

Figure 2:
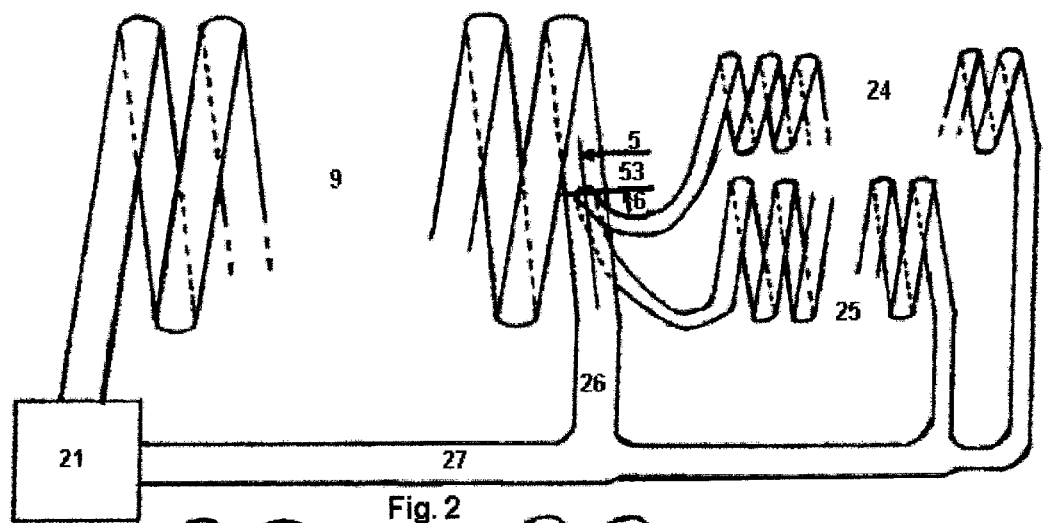
FIG. 2 illustrates the novel apparatus for heating and cooling by centrifugal force employing a movable or non-movable 3-way offshoot.

Referring now to FIGS. 1-A–1-E, there are shown components of a separator patented under U.S. Pat. No. 3,768, 658 by Mr. Palma. It has three hermetic rotating connections, devices for rotating a spiral pipe 10 within a cylinder 14. The spiral pipe is manufactured with numerous internally formed protrusions 24 and openings 28 in wall 20 of the spiral pipe. Protrusions 24a are located at the inside of the spiral pipe toward to its axis and protrusions 24b are located at the outside of the spiral pipe. There are three modifications protrusions 24'; 24"; and 24'" and they are shown in FIG. 1(B–E).

Referring now to FIG. 2 there is shown the improved centrifugal separator intended for heating and cooling and is capable of operating in a closed loop mode without Freon in unlimited range temperatures. This example shows a separator employing a moveable or nonmovable 3-way offshoot.

The improved cooler and heater comprises:

A device for moving gas or liquid 21;

A spiral pipe or cavity 9;

3-way offshoot 53;

A heat exchanger 24 for heating surroundings;

A heat exchanger 25 for cooling down surroundings;

A pipe or cavity 26 for gas or liquid with intermediate temperature for bypassing heat exchangers;

A collecting pipe or cavity 27;

Homogeneous or 2 component gas or liquid as working substance inside the apparatus.

As is known, every gas or liquid has some temperature however it is an average one. In reality every volume gas or liquid, that contains more than one molecule, has molecules with very different and mobile temperatures—this natural phenomenon is the basis of operation of the improved design cooler and heater which separates molecules by centrifugal force according to their specific gravity. Colder molecules have a heavier specific gravity and hotter molecules have a lighter specific gravity. After separation according to specific gravity, heavier molecules that are cold, occupy the outer cross section of the spiral pipe or cavity 9, they are used for cooling, and lighter molecules that are hot, occupy the inner cross section of the spiral pipe or cavity 9, are used for heating. A pipe is a passageway having a wall of equal thickness contrary to a cavity, which has a variable thickness wall that may include a common wall between coils of the spiral. The advantage of such a cooler and heater is that it works in practically unlimited temperature and pressure ranges and doesn't harm the environment. The only requirement for the working substance is its mobility in a given temperature range.

The most efficient mode of operation involves using a reduced heat-conductivity material or coating for the walls of the centrifugal separator and a combination of pressure and temperature causing as boiling in the cooling heat exchanger and condensation in the heating heat exchanger of the homogeneous or two component working substance. Offshoots allow varying extraction of the hottest and coldest molecules from a radially expanded shaped opening at the exit.

The prior art vortex cooler can obtain about –50° from air room's temperature, and the novel device can too.

Working substance, gas or liquid is being pressured by the device for moving, in particular by a compressor or ventilator 21 which goes into the spiral pipe or cavity 9, where its movement creates centrifugal force that increases, the specific gravity and therefore the absolute difference of weights of cold and hot molecules. The movement of gas or liquid along the spiral pipe or cavity 9, relieves and accelerates the division of cold and hot molecules according to their specific gravity. The cold molecules are heavier and therefore they are pressed to the outer cross-sectional area of the spiral pipe or cavity 9. The hot molecules are lighter and occupy the inner cross-sectional area of the spiral pipe or cavity 9. The molecules with average temperatures have intermediate specific gravity and so occupy the middle cross-sectional area of the spiral pipe or cavity 9. At the exit of the spiral pipe or cavity 9 is installed a movable or nonmovable 3-way offshoot in this example it is a moveable three-way offshoot 53, a possible section 5 is shown in FIG. 2 with three offshoots:

offshoot 55 from the outer cross section spiral pipe or cavity 9 for extraction of the coldest molecules, since they are heaviest in a given volume of gas or liquid and directing them into a heat exchanger 25 for cooling down the surroundings;

offshoot 56 from the middle cross-section of the spiral pipe or cavity 9 for the extraction of molecules with average temperature, which possess moderate specific gravity in a given volume of gas or liquid and directing them into pipe or cavity 26 which bypasses the heat exchangers 24 and 25;

offshoot 54 from the inner cross section of the spiral pipe or cavity 9 for extracting the hottest molecules, which possess the lightest specific gravity, in a given volume of gas or liquid and directing them in the heat exchanger 24 for heating the surroundings or removing heat from the system as in ordinary cool down equipment.

The moderate molecules in pipe or cavity 26 are directed into a collecting pipe or cavity 27 and after heat exchangers 24 and 25 the heaviest and lightest liquid or gas are also directed into the collecting pipe or cavity 27. Collecting pipe or cavity 27 is connected to the device for receiving the mixture of heaviest, lightest and moderate molecules from the collector pipe or cavity 27 and into the spiral pipe or cavity 9 for repeating the cycle.

The instantly claimed apparatus can include a nonmovable 3-or-more-way or or movable 2-or more-way offshoot at the outlet of the spiral pipe or cavity 9.

Figure 8:
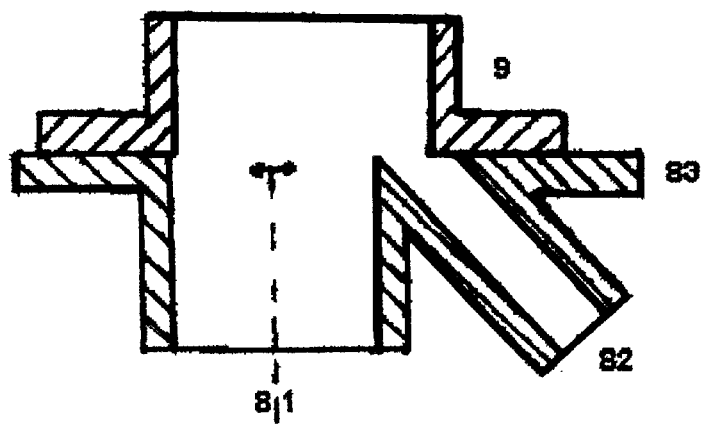
FIG. 8 shows section of possible design of a movable 2-way offshoot, having the capacity to vary the volume of a separated or purified mixture.

It can be several moveable 2-way offshoots or one 2-way moveable offshoot as shown in FIG. 8, the 2-way moveable offshoot could be located, like in NASA U.S. Pat. No. 5,248,421 as shown in FIG. 12, 2-way moveable offshoot after another along the spiral pipe or cavity 9.

Figure 7:
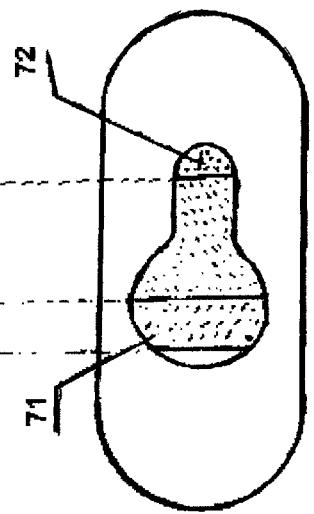
FIG. 7 illustrates radial section 6 shown on FIGS. 2 and 3 of a possible shape inner opening in the spiral pipe or cavity and offshoot with the capacity to fine tune the volume of the heaviest component of the mixture relative to the lightest component of the mixture.
Figure 6:
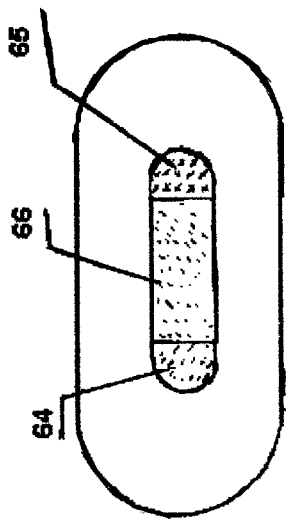
FIG. 6 illustrates radial section 6 shown on FIGS. 2 and 3 of a shape radially expanded inner opening of the spiral pipe or cavity and offshoot.

The end of the spiral pipe or cavity 9 can include a radially expanded opening like shown in FIGS. 6, and 7 that allows fine tunning the operation of the separator according to the requirements of a changing environment.

Figure 3:
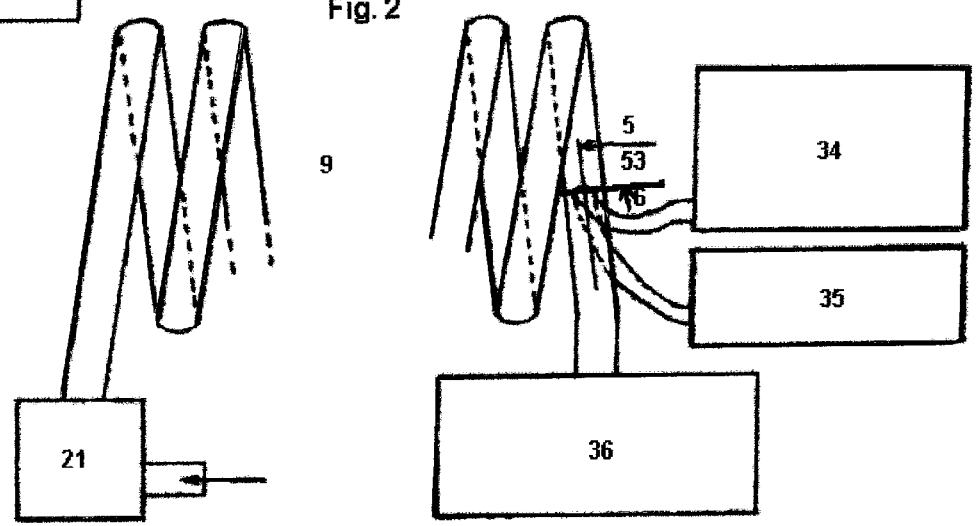
FIG. 3 illustrates a novel apparatus for the separation and purification: gases, liquids, powders, or desalting seawater employing a 3-way nonmovable, or movable offshoot.

Referring now to FIG. 3, there is shown an improved device for the division and clearance/purification of a mixture of gases, liquids, powders, and desalting seawater. This device employs a movable or nonmovable 3-way offshoot. The improved device for the division of gases, liquids, powders, and desalting seawater comprises:

A device 21 for moving the mixture media, in particular seawater;

A spiral cavity 9;

3-way offshoot 53;

Reservoir 34 for the separation of the lightest component of the mixture, in particular fresh water;

Reservoir 36 for the separation of the component with intermediate specific gravity in, particular seawater of intermediate concentration;

Reservoir 35 for the separation or the heaviest component of the mixture, in particular seawater of increased concentration.

The mixture from the device for moving media 21 is fed into the spiral pipe or cavity 9. The movement of the mixture along the spiral pipe or cavity 9 causes the separation of components of the mixture according to their specific gravity. At the exit of the spiral pipe or cavity 9 is installed a movable or nonmovable 3-way offshoot, in this example it is a moveable 3-way offshoot 53 a possible section 5 is shown in FIG. 3 with three offshoots:

Offshoot 54 from the inner side of the spiral cavity for the lightest component of the mixture, in particular fresh water, Offshoot 56 from the middle part spiral cavity for the component with intermediate specific gravity, in particular seawater of reduced saturation which is directed into reservoir 36;

Offshoot 55 from the outer side of the spiral cavity for the most heavy component mixture, in particular seawater of increased concentration which is directed into reservoir 35.

The end of the spiral pipe or cavity 9 can include a radially expanded opening like shown in FIGS. 6, and 7, that allows, fine tunning the operation of the separator according to the requirements of a changing environment.

The separated fluid can be taken from reservoirs by different ways depending upon prerequirements, in particular it can be let go freely, periodically taken off, at an outlet or of the reservoirs, or the reservoirs can be detachable.

This version is suitable for refinery petroleum from paraffin and gases at the well before transportation.

This version is also fit for environment protection on a vast scale by extracting $SO_3$ from exhausts of power plants for preventing acid rains and extracting toxic gases from the exhausts of chemical plants. It also allows extraction from air $O_2$ for medicine and metallurgy, $N_2$ for medicine and aerosols and $CO_2$ for beverage industry; In every volume of salt solution, containing more than one molecule, there are molecules of salt associated with a different and mobile number of molecules of water. In other words, every volume of solution, in particular seawater, containing more than one molecule, has different and mobile micro volumes of concentrated solution. This natural phenomenon is the basis for desalting seawater or any other solution. Molecules of salt associated with a lower number of molecules of water have a heavier specific gravity, and molecules of salt associated with a greater number, of molecules of water possess a lighter specific gravity. It should be considered that, although average specific gravity of a given volume of solution is relatively constant, every molecule of salt is associated with a different number of molecules water and hence possess different and variable specific gravities. This kind of desalting apparatus works most efficiently by employing the increased speed of the movement of a solution so that the difference of specific gravity of the salt and water is greater than the association force holding them together in a given solution.

The best mode of operation of the separator is achieved when the opening in the spiral pipe or cavity 9 is expanded radially and reaches one molecule of width between walls.

Figure 4:
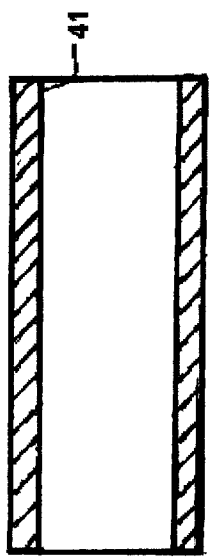
FIG. 4 illustrates the design of the inner surface of a spiral pipe or cavity of the improved apparatus.

Referring now to FIG. 4, there is shown a section of spiral pipe or cavity 9 of design with an even without any protrusions or openings inner wall 41.

Figure 5:
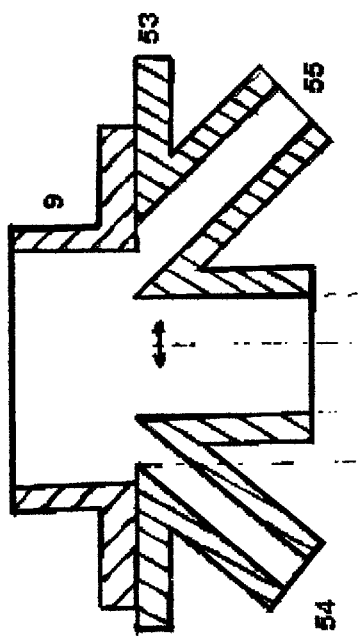
FIG. 5 illustrates section 5 shown on FIGS. 2 and 3 of a 3-way nonmovable or movable offshoot with the moveable offshoot having the capacity to vary the volume of the separated or purified mixture.

Referring now to FIG. 5, there is shown, an example of an axial section 5 of the spiral pipe or cavity 9 in FIGS. 2 and 3 with an attached movable or nonmovable 3-way offshoot 53 shown in FIG. 2 and FIG. 3 with the 3-way moveable offshoot having the capacity to vary the volume of separating media by offshoots 54, 55, 56.

When the 3-way moveable offshoot 53 moves right from the position shown, the square of the offshoot 54 is increased, the square area of the offshoot 55 is decreased, and the square area of the offshoot 56 remains the same.

When the 3-way moveable offshoot 53 moves left from the position shown, the square area of the offshoot 54 is decreased, the square area of the offshoot 55 is increased, and the square area of the offshoot 56 remains the same.

Referring now to FIG. 6, there is shown a possible example of a radial section 6 shown in FIGS. 2 and 3 with the occupation of three components of the mixture in a section of the outlet of the spiral pipe or cavity 9 and/or the inlet of the 3-way moveable on nonmovable offshoot 53. Section 65 shows the occupation of the heaviest component of the mixture. Section 66 and 64 show positions of the intermediate and the lightest components mixture respectively. FIG. 6 shows a radially expanded shaped opening at the end of the spiral pipe or cavity 9. Such a shape for the opening of the spinal pipe or cavity 9 traps extreme heavy and extreme light molecules preventing them from mixing. In particular such a shape for an opening of the spiral spiral pipe or cavity 9 for the cooling and heating device as shown in FIG. 2 traps the heavy colder molecules and the hotter lighter molecules, and prevents them from mixing and exchanging energy.

Referring now to FIG. 7, there is shown a section of a possible shape of outlet of the spiral pipe or cavity 9 and/or inlet of the 3-way movable offshoot 53 which has an increased efficiency in terms of increased capacity for fine tuning the volume of the heaviest components of the mixture. Section 71 shows the area occupied by the lightest component of the mixture and section 72 shows the area occupied by the heaviest component of the mixture. Movement of the offshoot 53 will increase or decrease roughly twice the volume extracted of light component relative the heavier component. This allows for the fine-tuning of the extraction of the heaviest component of the mixture.

This example of the feature allows for fine tunning the level of the coldest molecules extracted for cooling, or fine tunning the level of saturated seawater via outlet 55.

Figure 10:
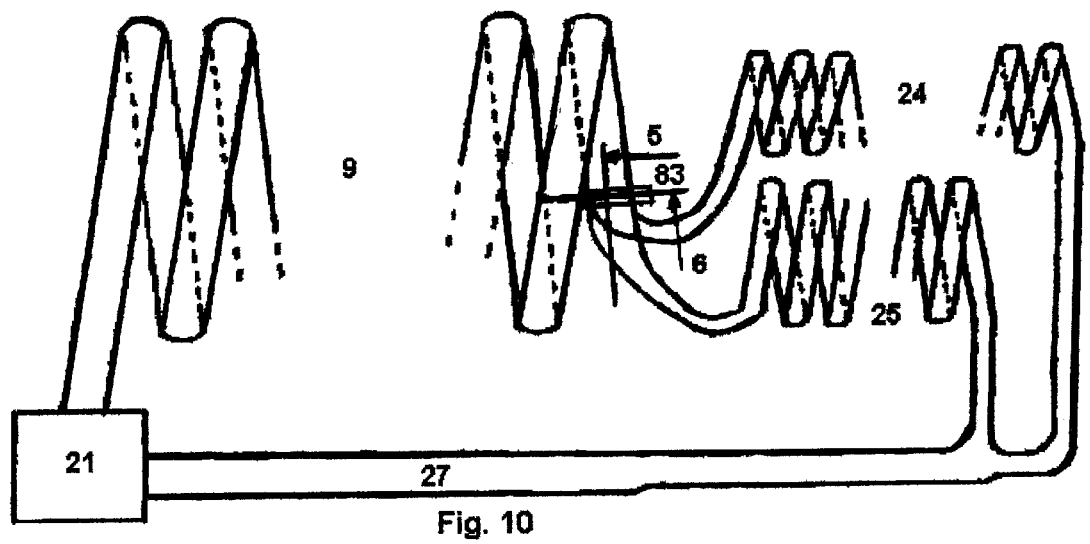
FIG. 10 illustrates the novel apparatus for heating and cooling by centrifugal force employing a 2-way movable offshoot.
Figure 11:
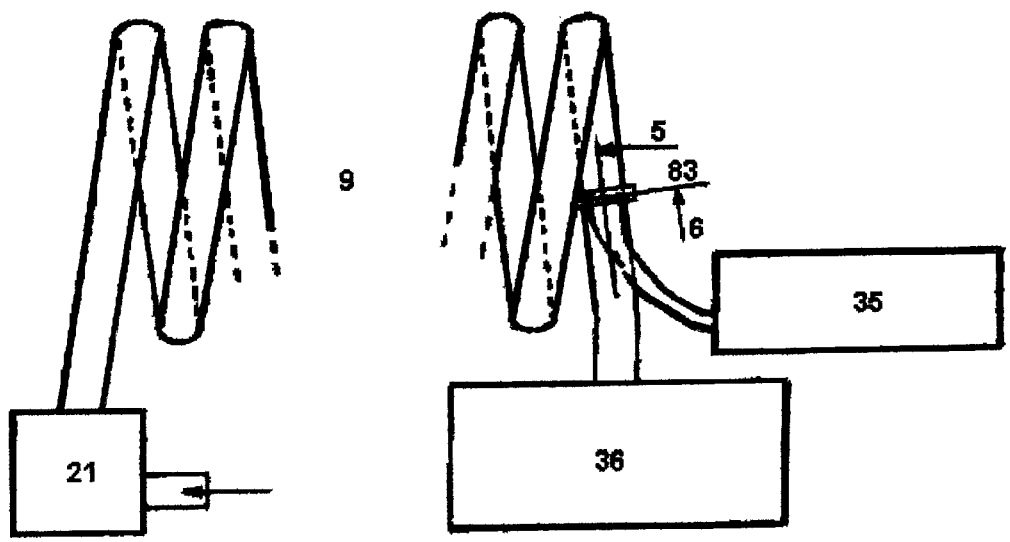
FIG. 11 illustrates a novel apparatus for the separation and purification: gases, liquids, powders, or desalting seawater employing a 2-way movable offshoot.

FIG. 8 shows a possible section 5 of a 2-way movable offshoot 83 shown in FIG. 10 and FIG. 11. It contains a spiral pipe or cavity 9 and an offshoot 83 with the capacity, to vary the extracted heavier component via opening 82 and the volume of the remaining mixture via opening 81. The opening 81 can be a continuation of the spiral pipe or cavity 9. The 2-way moveable offshoots can be installed one after another along the spiral pipe or cavity 9 in order to expand the number of fine tunnings of the compounds being extracted for increasing the efficiency of the process.

Figure 9:
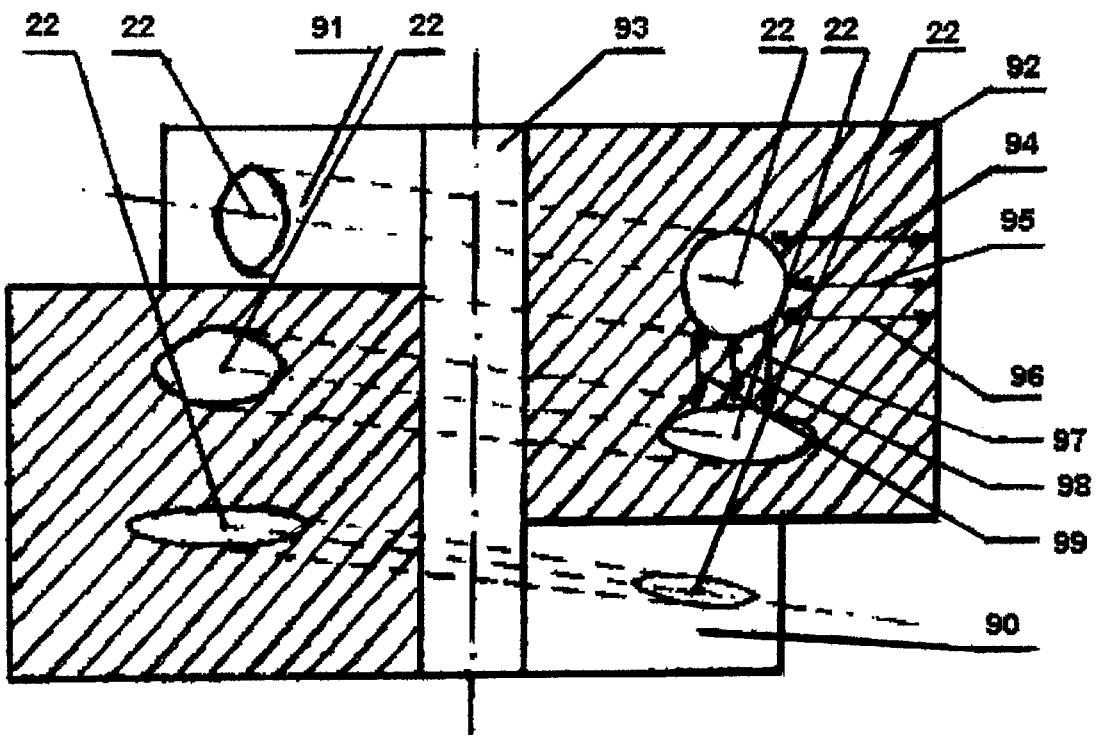
FIG. 9 shows a section view of a gradually changing shape spiral cavity.

FIG. 9 shows a section of a spiral cavity 9. It contains a smooth variable shaped passage 22 in a solid matter 92 with an optional opening 93 and different thickness walls 94, 95, 96, including common walls 97, 98, and 99. The Area for attachment of an inlet is marked 91 and that for attachment of 3-way movable or nonmoveable offshoot 53 or 2-way moveable offshoot 83 is marked 90. The best result of separation can be achieved when a radially expanded opening at the end of the cavity 9 reaches a width allowing the passing of only one molecule of component and the cavity 9 is manufactured from hard, temperature resistant materials or its surface is coated by them.

Referring now to FIG. 10 there is shown the improved centrifugal separator intended for heating and cooling and is capable of operating in a closed loop mode without Freon in unlimited range temperatures. This separator employs a moveable 2-way offshoot.

The improved design cooler and heater centrifugal separator comprises:

A device for moving gas or liquid 21;

A spiral pipe or cavity 9;

2-way moveable Offshoot 83;

A heat exchanger 24 for heating surroundings;

A heat exchanger 25 for cooling down surroundings;

A collecting pipe or cavity 27;

Homogeneous or 2 component gas or liquid as working substance inside the cooler and heater centrifugal separator.

As it is known, every gas or liquid has some temperature however it is an average one. In reality every volume gas or liquid, that contains more than one molecule, has molecules with very different and mobile temperatures—this natural phenomenon is the basis of operation of the improved design cooler and heater which separates molecules by centrifugal force according to their specific gravity. Colder molecules have a heavier specific gravity and hotter molecules have a lighter specific gravity. After separation according to specific gravity, heavier molecules that are cold, occupy the outer cross section of the spiral pipe or cavity 9, they are used for cooling, and lighter molecules that are hot, occupy the inner cross section of the spiral pipe or cavity 9, are used for heating. The only requirement for the working substance is its mobility in a given temperature range.

The most efficient mode operation such coolers involves using reduced heat-conductivity material or coating for walls of the centrifugal separator and combining pressure and temperature to cause boiling in a cooling heat exchanger and condensation in a heating heat exchanger. Offshoots allow varying extraction of the hottest and coldest molecules from a radially expanded shaped opening at their exit.

Working substance, gas or liquid is being pressured by the device for moving, in particular, by compressor or ventilator 21 is going into spiral pipe or cavity 9, where its movement creates centrifugal force that increase the specific gravity and therefore the absolute difference of weights of cold and hot molecules. The movement of gas or liquid along the spiral pipe or cavity 9 relieves and accelerates the division of cold and hot molecules according to their specific gravity. The cold molecules are heavier and therefore they are pressed to the outer cross-sectional area of the spiral pipe or cavity 9. The hot molecules are lighter and occupy the inner cross-sectional area of the spiral pipe or cavity 9. The molecules with average temperatures have intermediate specific gravity and occupy the middle cross-sectional area of the spiral pipe or cavity 9. At the exit of the spiral pipe or cavity 9 is installed a movable or nonmovable offshoot in this example it is a two-way movable offshoot 83, a possible section 5 is shown in FIG. 8 with two offshoots:

82 from the outer cross section of the spiral pipe or cavity 9 for extraction of the coldest molecules, since they are heaviest in a given volume of gas or liquid and directing them into a heat exchanger 25 for cooling down the surroundings;

81 from the inner cross section of the spiral cavity for extracting the hottest molecules, which possess the lightest specific gravity, in a given volume of gas or liquid and directing them in the heat exchanger 24 for heating the surroundings or removing heat from the system as in ordinary cool down equipment.

Collecting pipe or cavity 27 is connected to the device for receiving the mixture of heaviest, lightest and moderate molecules from the collector pipe or cavity and into the spiral pipe or cavity 9 for repeating the cycle.

The end of the spiral pipe or cavity 9 can include a radially expanded opening like shown on FIG. 6, and 7 that allows fine tunning the operation of the separator according to the requirements of a changing environment.

Referring now to FIG. 11, there is shown an improved for the division and clearance/purification of a mixture of gases, liquids, powders, and desalting seawater. This device employs a movable or movable 2-way offshoot. The improved apparatus for division gases, liquids, powders, and desalting seawater comprises:

A device 21 for moving mixture media, in particular seawater,

A spiral pipe or cavity 9;

2-way moveable offshoot 83;

Reservoir 35 for separating the lightest component of the mixture, particular fresh water;

Reservoir 36 for separating the heaviest component of the mixture, in particular seawater of increased concentration.

The mixture from the device for moving media 21 is fed into the spiral pipe or cavity 9. The movement of the mixture along the spiral pipe or cavity 9 causes the separation of components of the mixture according to their specific gravity. At the exit of the spiral cavity is installed a 2-way moveable offshoot 83 as shown in FIG. 8.

Offshoot 81 from the inner side of the spiral cavity is for the lightest component of the mixture, in particular fresh water, which is directed into reservoir 35;

Offshoot 82 from the outer side of the spiral pipe or cavity 9 for the heaviest component mixture in particular seawater of increased concentration, which is directed into reservoir 36.

The end of the spiral pipe or cavity 9 can include a radially expanded shaped opening like shown on FIGS. 6, and 7, that allows fine tunning the operation of the separator according to the requirements of a changing environment.

The separated fluid can be taken from reservoirs by different ways depending upon prerequirements, in particular it can let go freely, periodically taken off at an outlet of the reservoirs or the reservoirs can be detachable.

This version is suitable for refinery petroleum from paraffin and gases at the well before transportation.

This version is also fit for environment protection on a vast scale by extracting $SO_3$ from exhausts of power plants for preventing acid rains and extracting toxic gases from the exhausts of chemical plants. It also allows extraction from air $O_2$ for medicine and metallurgy, $N_2$ for medicine and aerosols and $CO_2$ for beverage industry; In every volume of salt solution, containing more than one molecule, there are molecules of salt associated with a different and mobile number molecules of water. In other words, every volume of solution, in particular seawater, containing more than one molecule, has different and mobile micro volumes of concentrated solution. This natural phenomenon is the basis for desalting seawater or any other solution. Molecules of salt associated with a lower number of molecules of water have a heavier specific gravity, and molecules of salt associated with a greater number of molecules of water possess a lighter specific gravity. It should be considered that, although average specific gravity of a given volume of solution is relatively constant, every molecule of salt is associated with a different number of molecules water and hence posses different and variable specific gravities. This kind of desalting apparatus works most efficiently by employing the increased speed of the movement of a solution so that the difference of specific gravity of the salt and water is greater than association force holding them together in a given solution.

The best mode of operation of the separator is achieved when the opening in the spiral cavity is expanded radially and reaches one molecule of width between walls.

Referring now to FIG. 12, there is shown the NASA U.S. Pat. No. 5,248,421 for the demonstration of 2-way nonmovable offshoots along the spiral pipe. It contains an inlet 11, offshoots 12a, 12b, 12c, 12d and 12e which are situated one after another along the spiral pipe and an outlet 13.

While the invention has been particularly shown and described with respect preferred embodiments thereof, it should be understood by those skilled in the art that the foregoing and other changes in form and details may be made without departing from the spirit and scope of the invention which should be limited only by scope of the appended claims.

What is claimed is:

1. A spiral separator for separating a fluid into a heavier component, at least one intermediate component and a lighter component, comprising: a spiral cavity; said spiral cavity comprising a spiral passage with a varying thickness wall between coils; said spiral passage with a varying thickness wall comprising an inlet, an outlet an outer cross-sectional area for collecting said heavier component, at least one intermediate cross-sectional area for collecting said at least one intermediate component and a inner cross-sectional area for collecting said lighter component, said spiral passage being connected at said outlet to a three-or-more way non-movable or movable offshoot means, a first portion of said three-or-more way non-movable or movable offshoot means being connected at said spiral passage's outer cross-sectional area for collecting the heavier component, a subsequent portion or portions of said three-or-more way non-movable or movable offshoot means being connected at said spiral passage's at least one intermediate cross-sectional area for collecting the at least one intermediate component and a last portion of said three-or-more way non-movable or movable offshoot means being connected at said spiral passage's inner cross-sectional area for collecting the lighter component.

2. A spiral separator as claimed in claim 1, further comprising at least two heat exchangers, one of said at least two heat exchangers being connected to said first portion of the three-or-more way non-movable or moveable offshoot means for collecting said heavier component, and another one of said at least two heat exchangers being connected to said last portion of said three-or-more way non-movable or moveable offshoot means for collecting said lighter component.

3. A spiral separator as claimed in claim 1, further comprising at least one reservoir in fluid communication with one of said portions of the three-or-more way non-movable or moveable offshoot means, the at least one reservoir receiving one of the group consisting of the heavier component, one of the intermediate components, and the lighter component.

4. A spiral separator as claimed in claim 1, wherein the three-or-more way non-movable or moveable offshoot means is movable so as to be variable operable to separate the fluid into three-or-more components of varying volumes.

5. A spiral separator as claimed in claims 1, wherein the spiral cavity's cross-section has a predetermined gradually changing form, the form being circular at the inlet and radially extended at the outlet.

6. A spiral separator as claimed in claim 1, constructed and arranged so that the fluid to be separated is a homogenous or two component gas and/or liquid fluid.

7. A spiral separator as claimed in claim 1, wherein said three-or-more way non-movable or movable offshoot means is a plurality of three-or-more way non-movable or movable offshoot means situated along the spiral cavity one after another.

8. A spiral separator as claimed in claim 1, constructed and arranged so that the fluid to be separated is petroleum polluted by water or its product polluted by water, the petroleum or its product polluted by water being mixture of petroleum or its product and water, said heavier component being water containing some petroleum or its product and the lighter component being petroleum or its product.

9. A spiral separator as claimed in claim 1, constructed and arranged so that the fluid to be separated is petroleum from an oil-well before a pipe-line, the petroleum being a mixture of hydrocarbons, asphalt and paraffin, said heavier component being asphalt and paraffin containing some hydrocarbons, and said lighter component being hydrocarbons.

10. A spiral separator as claimed in claim 1, constructed and arranged so that the fluid to be separated is exhaust from a power plant, the exhaust comprising a mixture of $SO_3$, $CO_2$ and CO gases, wherein said heavier component comprises $SO_3$ and some CO, and the lighter component comprises $CO_2$ and CO gases.

11. A spiral separator as claimed in claim 1, constructed and arranged so that the fluid to be separated is a crude oil mixture of hydrocarbons containing different grade fuels, said different grade fuels including fuel oil and benzene, said heavier component being fuel oil and said lighter component being benzene.

12. A spiral separator for separating a fluid into a heavier component and a lighter component, comprising: a spiral cavity, said spiral cavity comprising a spiral passage with a varying thickness wall between coils; said spiral passage comprising an inlet, an outlet, an outer cross-sectional area for collecting said heavier component and an inner cross-sectional area for collecting said lighter component, said spiral passage being connected at said outlet to a two-way movable offshoot means, a first portion of said two-way movable offshoot means being connected at said spiral passage's outer cross-sectional area for collecting the heavier component, and a remaining portion of said two-way movable offshoot being connected at said spiral passage's inner cross-sectional area for collecting the lighter component, wherein said two-way movable offshoot is variable operable to separate said fluid into said heavier and lighter components.

13. A spiral separator as claimed in claim 12, further comprising at least two heat exchangers, one of said at least two heat exchangers being connected to said first portion of the two-way movable offshoot means for collecting said heavier component, and another one of said at least two heat exchangers being connected to said remaining portion of said two-way moveable offshoot for collecting said lighter component.

14. A spiral separator as claimed in claim 12, further comprising at least one reservoir in fluid communication with one of said portions of the two-way moveable offshoot means, the at least one reservoir receiving one of the group consisting of the heavier component and the lighter component.

15. A spiral separator as claimed in claim 12, wherein the spiral cavity's cross-section has a predetermined gradually changing form, the form being circular at the inlet a radially expanded at the outlet.

16. A spiral separator as claimed in claim 12, constructed and arranged so that the fluid to be separated is a homogenous or two component gas and/or liquid fluid.

17. A spiral separator as claimed in claim 12, wherein said two-way movable offshoot means is a plurality of two-way movable offshoot means situated along the spiral cavity one after another.

18. A spiral separator as claimed in claim 12, constructed and arranged so that the fluid to be separated is petroleum polluted by water or its product polluted by water, the petroleum polluted by water or its product polluted by water being a mixture of petroleum or its product and water, said heavier component being water containing some petroleum or its product, and the lighter component being petroleum or its product.

19. A spiral separator as claimed in claim 12, constructed and arranged so that the fluid to be separated is petroleum from an oil-well before a pipe-line, the petroleum being a mixture of hydrocarbons, asphalt and paraffin, said heavier component being asphalt and paraffin containing some hydrocarbons, and said lighter component being hydrocarbons.

\* \* \* \* \*